(12) United States Patent
Gaboury et al.

(10) Patent No.: US 8,702,135 B2
(45) Date of Patent: Apr. 22, 2014

(54) RADAR COMPATIBLE AUTOMOTIVE BADGE AND FASCIA

(75) Inventors: Scott Howard Gaboury, Ann Arbor, MI (US); Joel Thomas Pierce, Whitmore Lake, MI (US); Jolanta Budek, Grosse Pointe Farms, MI (US); James F. Krizman, Dearborn, MI (US); Anthony Gerald King, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/602,329

(22) Filed: Sep. 4, 2012

(65) Prior Publication Data
US 2014/0062114 A1  Mar. 6, 2014

(51) Int. Cl.
*B60R 19/48* (2006.01)
(52) U.S. Cl.
USPC ............................ 293/117; 293/120; 293/121
(58) Field of Classification Search
CPC .................................................... B60R 19/483
USPC ................. 293/102, 117, 155, 120, 121, 122; 296/187.01, 30, 29
IPC ...................................................... B60R 19/48
See application file for complete search history.

(56) References Cited

U.S. PATENT DOCUMENTS

| 6,839,943 | B2 * | 1/2005 | Burkhardt et al. | 24/458 |
|---|---|---|---|---|
| 7,357,431 | B2 * | 4/2008 | Sato et al. | 293/117 |
| 7,616,102 | B2 * | 11/2009 | Kudelko et al. | 340/435 |
| 7,784,855 | B2 * | 8/2010 | Faass et al. | 296/187.01 |
| 7,980,615 | B2 * | 7/2011 | Hashimoto et al. | 296/29 |
| 8,480,142 | B2 * | 7/2013 | Wuerfel | 293/117 |
| 2002/0149212 | A1 * | 10/2002 | Wild et al. | 293/117 |

* cited by examiner

*Primary Examiner* — Glenn Dayoan
*Assistant Examiner* — Pinel Romain
(74) *Attorney, Agent, or Firm* — Joseph E. Root

(57) ABSTRACT

A vehicle with a front fascia and a decorative badge integrated with the fascia. A rear surface of the badge is attached to a front portion of the fascia. The portion of the fascia to which the badge is attached is the badge mounting region, and the fascia's portion surrounding the badge mounting region is the fascia surrounding region. A radar system mounted behind the fascia emits radar beams in forward direction, which are intercepted by the fascia and the badge in the badge mounting region, and by the fascia, in the fascia surrounding region The rear surface of the fascia in the badge mounting region is indented the amount of the badge's average thickness, and the cumulative average thickness of the badge and the fascia material in the badge mounting region remains uniform throughout, equal to the average thickness of the fascia in the fascia surrounding region.

20 Claims, 3 Drawing Sheets

RADAR COMPATIBLE AUTOMOTIVE BADGE AND FASCIA

BACKGROUND OF THE INVENTION

The present invention generally relates to vehicle corporate badge and fascia designs, and more specifically, to badge and fascia designs compatible with radar systems.

Adaptive cruise control systems (ACC) are used in automotive vehicles to provide drivers with enhanced features including controlling the vehicle speed, and maintaining a safe-distance with a vehicle ahead, thus also maintaining a desired speed, and at times accelerating the vehicle under clear lane conditions, or decelerating it on sudden detection of a vehicle in front. Most of these systems use radars for measuring the distance of the vehicle in front, and its relative speed, and, if required, the directional angle of the front vehicle. Radar systems emit and receive electromagnetic waves, specifically radio waves, which have low penetration capabilities within the metallic/chrome materials commonly used in automotive emblems or badges. Therefore, the exact location for mounting the automotive badges with respect to the radar systems is crucial, and is driven by many parameters. One concern is to retain the stylish and aesthetic appeal of the vehicle front, and thus, the automotive radar systems are typically mounted behind fascia material to make them invisible to the customers. This also keeps their functionality substantially unaffected by environmental factors. Another concern is with how compatible is the radar with the fascia material and the badge that is mounted on the fascia. The fascia and the badge can intercept the emitted and received radar beams, and this interception could obstruct the radar beams, especially if the badge is made of any metallic material, or if the badge is not otherwise designed to support the radar beams.

Attempts have been made by automotive companies to develop radar compatible badges that are substantially flat, and non-metallic, so that the radar beams pass through them with minimal interruption. However, due to constraints like maintaining the styled appearance, size and aesthetic appeal of some vehicle emblems or badges, some manufacturers' badges/logos are not easily designed to be compatible with radar beams. Further, certain designs of corporate badges or logos like, for instance, the Lincoln badge, require a three-dimensional raised mountable surface. Designing such a badge to make it compatible with radar beams is difficult.

Therefore, there exists a need for a unique design of a corporate badge and fascia that can be positioned within the radar beam projection and still be functional within the radar system.

SUMMARY OF THE INVENTION

The present disclosure describes a design for a decorative badge and fascia for an automotive vehicle that does not disturb the vehicle's radar system, and is adapted to be positioned within the vehicle's front fascia.

In one aspect, the present disclosure provides a decorative badge attached to a vehicle's front fascia. The badge has a front surface and a rear surface, and the front surface of the badge is attached to the fascia's rear surface (back loaded). The portion of the fascia to which the badge is attached is the badge mounting region, and the fascia's portion that surrounds the badge mounting region is the fascia surrounding region. A forwardly facing radar system is positioned behind the fascia, which emits radar beams forwardly, and the beams pass through the badge mounting region and a portion of the fascia surrounding region. The rear surface of the fascia in the badge mounting region is indented the amount of the badge average thickness, so that the average thickness of the fascia surrounding region, construed along the direction of transmission of the radar beams, is the same as the combined average thickness of the badge and the fascia in the badge mounting region.

In another aspect, the present disclosure provides a vehicle including a front fascia and a badge including a front piece and a rear piece. The badge is integrated to the fascia in a manner that the front piece is positioned in front of, and attached to, a front surface of the fascia. The rear piece is positioned behind, and attached to, a rear surface of the fascia. In this way, the fascia is positioned between the two pieces of the badge. The portion of the fascia to which the two pieces are attached, is the badge mounting region. A forwardly facing radar system emits radar beams which are intercepted by the fascia and the badge in the badge mounting region. The average cumulative thickness of the badge and the fascia in the badge mounting region, as construed along the direction of the radar beams' transmission, remains uniform throughout the badge mounting region.

The badge is uniformly composed of a plastic material, and this allows a high transmission coefficient for the electromagnetic radio waves emitted by the radar system, through the badge.

In an embodiment of the present disclosure, the badge has protrusions and depressions for decorative purposes, contained within the constant wall thickness at specific locations, depending on the variations in the thickness of the fascia material behind the badge, in the badge mounting region. The protrusions and depression maintain a uniform average cumulative thickness of the badge and the fascia, in the badge mounting region.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 1 (B) illustrates an embodiment where the badge has a front surface incorporating protrusions and depressions at different locations.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

The present disclosure pertains to a design of a badge mountable over a vehicle's front fascia, and compatible with the vehicle radar system positioned at any location behind the fascia.

Typically, radar systems used for adaptive cruise control (ACC) in vehicles are provided with a radar transparent cover (RADOME) that protects them from environmental factors and covers the ACC radar sensor, thus maintaining the aesthetic appeal of the vehicle's front portion. The RADOME material usually has a high transmission coefficient for electromagnetic waves, and it provides quite low intrinsic transmission losses. When it is desired for the radar to be mounted at relatively higher front positions on a vehicle, radar beams are often intercepted by the automotive badge's surface, and this requires the badges to be compatible with the radar system's functionality. Many vehicle badges are large, and enclose a large area that covers and hides the radar sensors. This maintains the stylish appeal of the vehicle's front fascia. However, at times, there is a size-limit desired by the manufacturers, so the badges cannot be so large.

The badge and fascia of the present disclosure provides an effective solution to the aforementioned problems. The badge is easily mountable at front center over a vehicle's front fascia, and is still compatible with the vehicle's radar system mounted behind the fascia. Effectively, with the badge integrated into the fascia, the badge-fascia combination is radar compatible, along the entire region where the combination intercepts the emitted and received radar beams.

Figure 1:
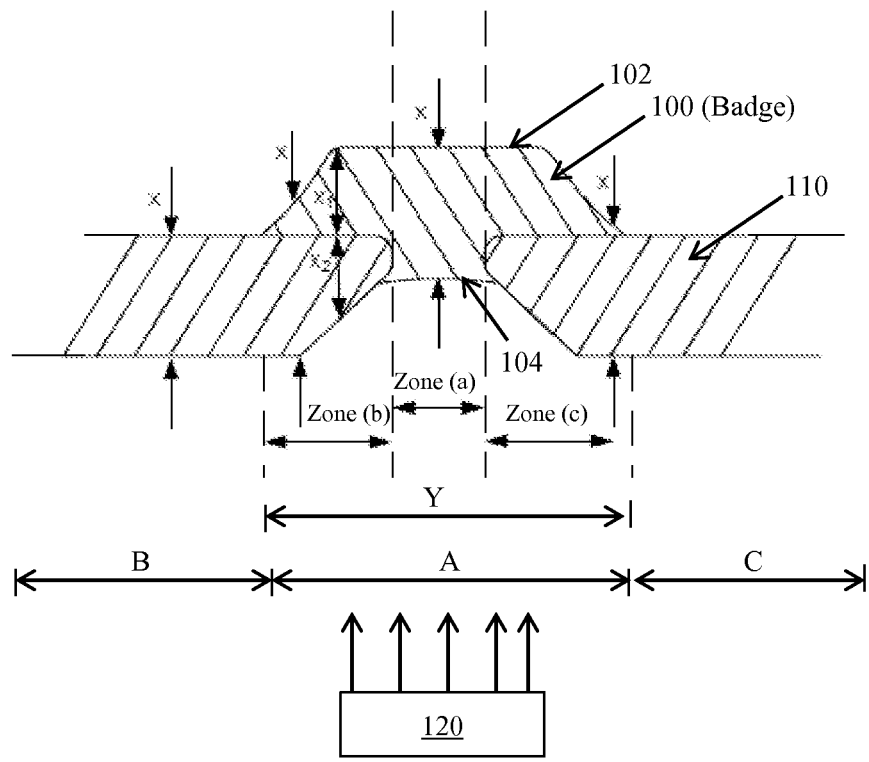
FIG. 1 (A) is a constant cross section of the badge meshing with and integrated to the vehicle's front fascia, in accordance with the present disclosure.
Figure 1:
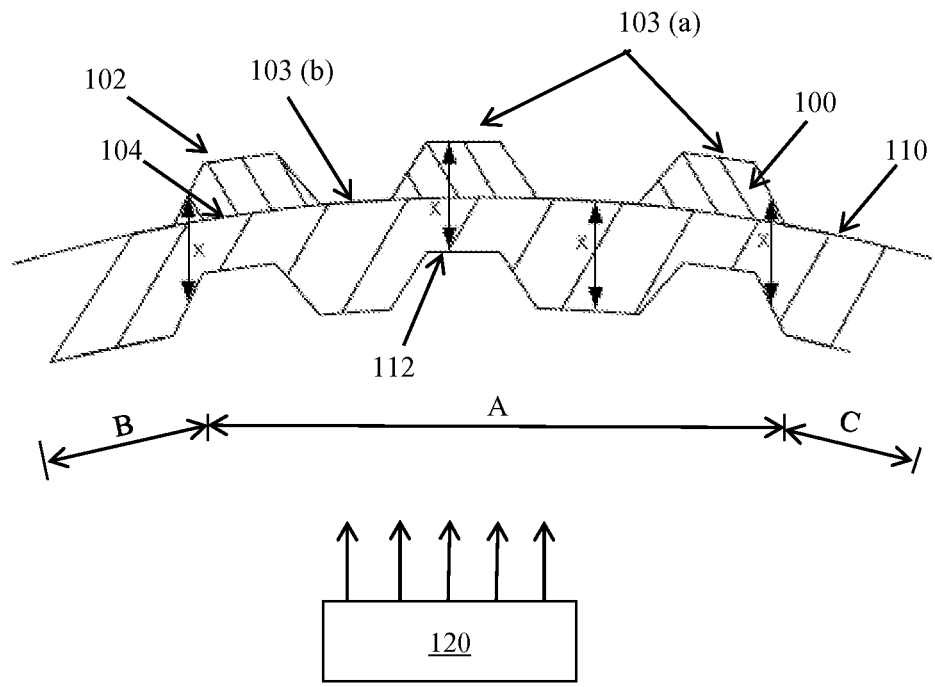

FIG. 1 (A) is a constant section of an exemplary badge 100 in accordance with the present disclosure, mounted over and integrated with a vehicle's front fascia 110. The vehicle has a radar system 120 mounted behind the fascia 110. The badge 100 includes a front surface 102 and a rear surface 104 attached to and engaging with the fascia 110. The rear surface 104 is fixedly attached or sealed to the fascia 110. Any suitable means for fixing the rear surface 104 of the badge 100 to the fascia 110 can be employed. An adhesive backing material or any other appropriate fixture material can be used for this purpose. The badge 100 may be provided at an offset to the fascia, and still be integrated with it through an engaging means. The portion of the fascia 110, to which the badge 100 is attached, is the badge mounting region, as shown by the region 'A'. Further, the portions of the fascia 110, surrounding the badge mounting region 'A' on either side of the badge 100, are the fascia surrounding regions, as represented by regions 'B' and 'C'.

The cumulative average thickness of the fascia 110 and the badge 100, in the badge mounting region 'A', remains uniform, as construed along the direction of the radar beams emitted by the forwardly facing radar system 120, and this thickness is same as the average thickness of the fascia 110 in the fascia surrounding regions 'B' and 'C'. In an aspect, the cumulative average thickness of the fascia 110 and the badge 100, in the badge mounting region 'A', is an integral multiple of '$\lambda/2$', wherein '$\lambda$' represents the wavelength of the radar beam within the interfacing material. The rear surface 104 of the badge 100 engages with the fascia 110 in a manner that the combined thickness of the material interfacing the radar beams remains constant throughout the badge mounting region 'A' and the fascia surrounding regions 'B' and 'C', as shown. This constant is designed to be an integral multiple of $\lambda/2$. Mathematically, with the parameters shown:

$$x_1 + x_2 = n*(\lambda/2); \text{ '}n\text{' being an integer} \quad (i)$$

This design criterion ensures an optimal performance of the vehicle's radar system 120 and minimizes the transmission losses through the badge 100 and the fascia material that intercepts the radar beams. Since the wavelength of the emitted radar beams ('$\lambda$'), within the badge, depends upon the constituting material of the badge, the exact designed value of the cumulative thickness of the badge material and the fascia material (i.e., X1+X2), in the badge mounting region 'A', depends at least partially upon the material of the badge. Further, those skilled in the art will understand that the width 'Y' of badge 100 may be varied as the entire badge material possesses characteristics compatible with the radar system 120.

The designed cross-sectional thickness of the material of the badge 100 enclosed between its front surface 102 and the rear surface 104, depends upon the wavelength of the electromagnetic radar waves in the material of the badge 100, considering the criteria specified in the Eq. (i) above. Specifically, as illustrated in FIG. 1 (a), in Zone (a) of the badge mounting region 'A', where the badge's rear surface 104 exclusively interfaces the radar beams directly, the thickness of the badge (denoted by 'X') is substantially constant along the entire width of the zone. In Zone (b) and Zone (c), where the badge 100 is integrated to the fascia 110, and the badge 100 and the fascia 110 cumulatively intercept the radar beams, the combined average thickness of the badge 100 and the fascia 110, i.e., X1+X2, is invariant.

In an embodiment, when the radar system 120 operates at about 77 GHz, the emitted radar beams have a wavelength of about 0.00389 meters in vacuum. With this value, the corresponding wavelength of the radar beams in the badge material is about 0.00245 m., considering the badge being uniformly composed of plastic. Substituting this '$\lambda$' value in Eq. (i) above, the value of the combined thickness of the badge 100 and the fascia 110, in the badge mounting region 'A', should be an integral multiple of about 1.25 mm. Hence, the badge and the fascia 110 are designed to have a combined optimal thickness of about 1.25 mm., 2.5 mm., 3.75 mm., etc. These designs have been implemented and tested, and have been successful in providing optimum radar performance, with minimal obstruction to the emitted radar beams.

FIG. 1 (B) illustrates an embodiment where the, the front surface 102 of badge 100 has multiple protrusions 103 (*a*) and depressions 103 (*b*) within the badge thickness, for decorative purpose. In such a case, the fascia 110 has an indented rear surface 112, to maintain a constant overall thickness of badge 100 and the fascia 110 interfacing the radar beam transmission zone, in the badge mounting region 'A'. Specifically, the rear surface 112 of the fascia 110 is indented at certain locations by a specific amount, equal to the badge's average thickness, to incorporate the thickness of the badge 100 in the badge mounting region 'A', and to maintain a uniform cumulative thickness of the material of the badge 100 and the fascia 110, in the badge mounting region 'A'. These locations correspond to, and lie right behind the locations on the badge 100, where the badge's front surface protrudes, to take an account of the increase in badge's thickness along these protruding regions. As shown, the thickness of the material facing the radar beams remains invariant throughout the regions where the radar beams are intercepted, including the badge mounting region 'A' and the fascia surrounding regions 'B' and 'C'. Specifically, the thickness of the intercepting material remains at a constant value 'X', throughout the badge mounting region 'A' and the fascia surrounding regions 'B' and 'C'.

Figure 2:
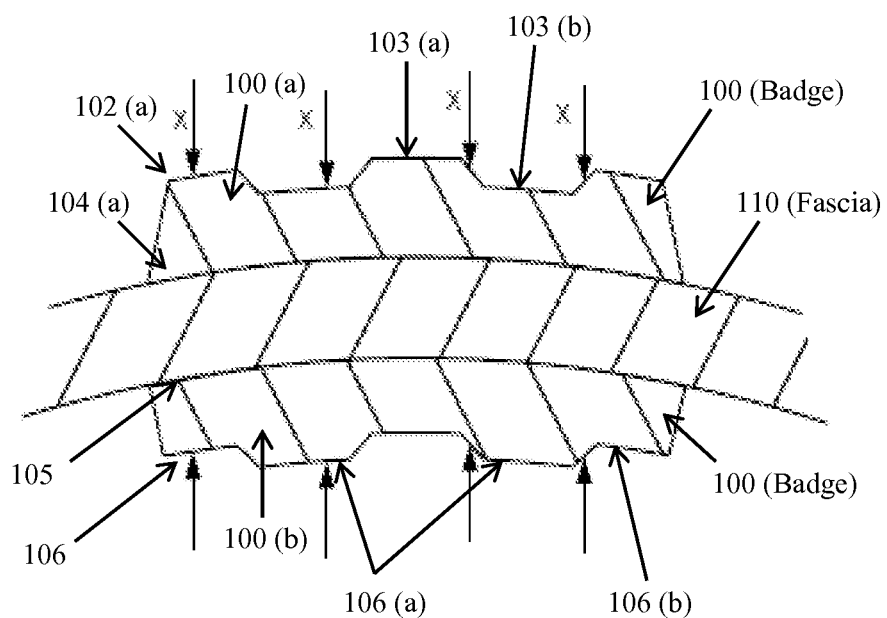
FIG. 2 illustrates an embodiment where the badge of the present disclosure is made of two separate pieces, positioned to include a portion of fascia between them.
Figure 2:
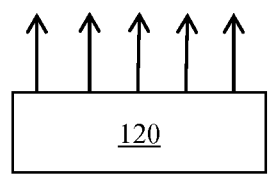

FIG. 2 illustrates an embodiment where the badge integrated to the fascia, is made of two separate pieces joined together, and positioned at the front portion of the vehicle, in a manner that the fascia lies between these two pieces. As shown in the cross-sectional view, the badge 100 includes two pieces, specifically, a front piece 100 (*a*) and a rear piece 100 (*b*). The fascia 110 is positioned between these two pieces. In this embodiment, the fascia 110 has a constant cross-sectional thickness, and any variations in the design of the front piece 100 (*a*), are taken in account by incorporating corresponding variations in the design of the rear piece 100 (*b*). This maintains a uniform cumulative thickness of the badge 100 and the fascia 110 along the entire region where they intercept the radar beams. Specifically, the front piece 100 (*a*) has a front surface 102 (*a*) and a rear surface 104 (*a*) attached to the fascia 110's front portion. The front surface has multiple protrusions 103 (*a*) and depressions 103 (*b*) provided at different locations, for decorating the badge and maintaining its aesthetic appeal. The rear surface 104 (*a*) is a smooth surface, having a profile similar to the fascia 110's front surface, to facilitate tessellation and engagement of the rear surface 104 (*a*) with the fascia 110. Specifically, the rear surface 104 (*a*) is fixedly attached to the fascia 110 by suitable means, including heat staking the badge 100, or mechanically attaching it to the fascia 110 through a set of clips. However, the rear surface 104 (*a*) can also be adhesively sealed to the fascia 110. The rear piece 100 (*b*) has a rear surface 106, and a front surface 105 attached to the fascia 110's rear surface. As shown, the rear surface 106 also has multiple protrusions 106 (*a*) and depressions 106 (*b*). The rear piece 100 (*b*) is designed in a manner that the protrusions 106 (*a*) and the depressions 106 (*b*) lie right behind the depressions 103 (*b*) and the protrusions 103 (*a*), respectively, in the front piece 100 (*a*), when the two pieces of the badge are mounted over the fascia 110. Specifically, each protrusion within the front surface 102 (*a*) of the front piece 102 substantially aligns with a depression within the rear surface 106 of the rear piece 100 (*b*), and they have similarly varying profiles, as shown. This maintains a constant cumulative thickness 'X' of the badge 100 and the fascia 110, as construed along the forward emission field of the radar system 120. The badge 100, integrated to the fascia 110, in this manner, minimally obstructs the emitted radar beams, and facilitates optimum performance of the radar system 120.

Figure 3:
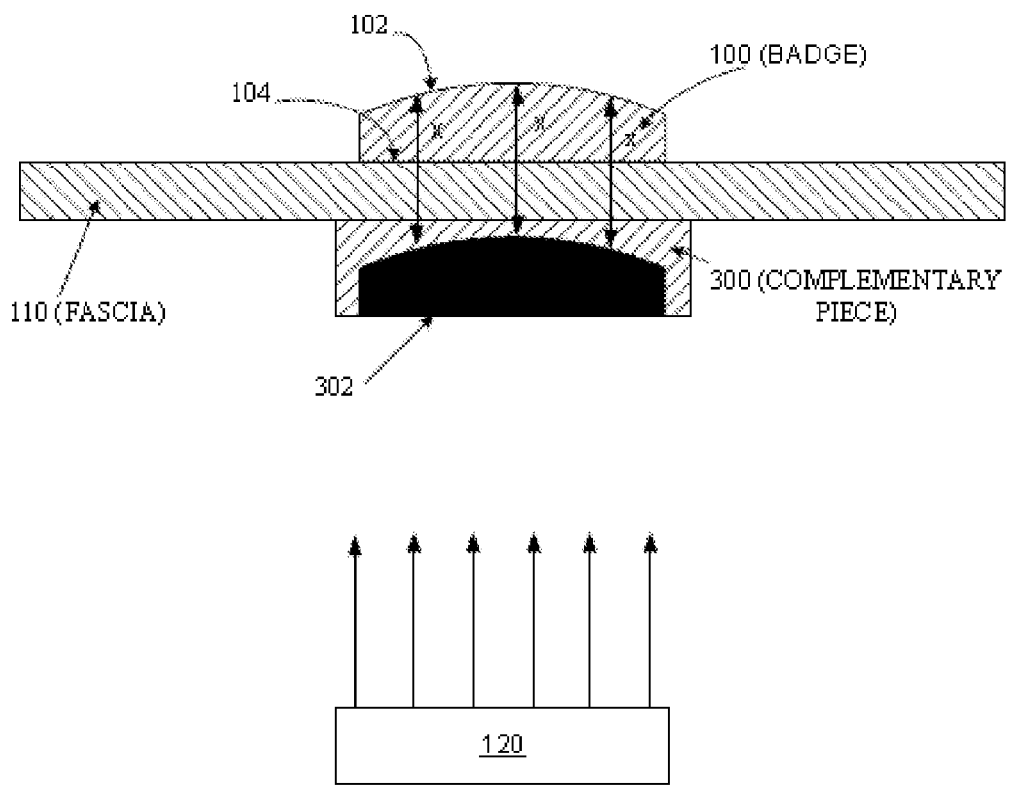
FIG. 3 illustrates an embodiment where a complimentary piece is attached to the fascia's rear surface, to incorporate variations in the thickness of the badge attached to the fascia.

FIG. 3 illustrates another embodiment showing a different design for a badge 100 mounted over the front fascia 110 of a vehicle. To incorporate variation in the thickness of the front surface 102 of the badge 100, a complimentary piece 300 is mounted behind the fascia 110. The complimentary piece 300 is indented all along the region 302, as shown, taking into account the variations in the cross-sectional thickness of the badge 100. Specifically, the region 302 is indented more along portions where the badge has higher thickness, and vice versa. Also, the indentation has the same profile as the profile of the front surface 102 of the badge 100. Due to this, a uniform overall thickness of the badge 100 and the fascia 110, along the badge mounting region, is again maintained, along the direction substantially parallel to the transmission of radar beams.

The intrinsic properties of the badge material and its design criteria are now described in further details. Throughout its cross-sectional area intercepting the radar transmission zone, the badge 100 is designed to have a uniform thickness, as mentioned above. Further, the entire composing material for the badge 100 is preferably plastic, there being no metal or chrome-containing materials used for the same, as such materials provide obstructions to the transmission of radar waves due to their high relative electric permittivity and low transmission coefficient for radio waves. For maintaining the aesthetic and stylish appeal of the badge 100, specifically of its visible front surface 102, badge 100 is coated with a material that exhibits shining properties. Coating the front surface 102 with bright paint is one possible and comparatively economical solution. A silver metal vapor deposition coating on the same is another alternative. In an embodiment, for a brighter and more efficient display of the front surface 102, a thin polymer film with a substantially high reflectivity can be used as a coating material. This provides an extremely high reflectivity over a wide spectrum of wavelengths of radar beams. In an embodiment, an enhanced specular reflector material film (ESR) is used for this purpose.

Another crucial criterion for the badge material is that there should be no perforations or spaces on its surface, to prevent accumulation of layers of water within it, as the water layers provide obstruction to the transmission of the electromagnetic radio waves, even when the badge 100 lies at least partially in the radar transmission zone. Construed simply, the badge 100 is designed to be water-tight and the coating on its surface is preferably hydrophobic.

To minimize transmission losses, it is preferred to use a thin layer for coating the front surface 102 of badge 100. The coating layer should have a substantially low relative electric permittivity, preferably in the range of 5 to 8.

The badge 100 can be mounted at to the front center of the fascia 110, and it still remains compatible with the vehicle's radar system, thus providing no obstructions to the transmission of radar waves. The badge's composing material and its designed thickness enables accomplishment of the objectives of the current disclosure.

Although the current invention has been described comprehensively, in considerable details to cover the possible aspects and embodiments, those skilled in the art would recognize that other versions of the invention may also be possible.

What is claimed is:

1. A front fascia for a vehicle, the vehicle including a forward facing radar system emitting radar beams that pass through the front fascia, the front fascia comprising
   a decorative badge attached to a front surface of the fascia at a badge mounting region, the badge being positioned such that at least a portion of the radar beams pass through the badge;
   wherein the badge mounting region is indented such that a cumulative thickness of the badge and badge mounting region traversed by the radar beams passing through the badge and badge mounting region remains substantially uniform across the badge mounting region.

2. The front fascia of claim 1, wherein the cumulative average thickness of the badge and the badge mounting region remains uniform throughout.

3. The front fascia of claim 1, wherein the badge is heat staked or mechanically attached with clips to the front fascia.

4. The front fascia of claim 1, wherein the front surface of the badge has decorative protrusions and depressions provided at specific locations thereon, and the rear surface of the fascia is indented at locations substantially aligning with the locations where the badge has protrusions, to maintain a uniform cumulative average thickness of the material of the badge and the fascia intercepting the transmitted radar beams, in the badge mounting region.

5. The front fascia of claim 1, wherein the badge's front surface has slight plan view sweep to parallel the leading edge or forward facing sweep of the radar beam cone.

6. The front fascia of claim 1, wherein the cumulative average thickness of the badge and the fascia in the badge mounting region depends at least upon the composing material of the badge.

7. The front fascia of claim 1, wherein the badge is composed of a material with a substantially high transmission coefficient for electromagnetic radio waves.

8. The front fascia of claim 1, wherein the badge is substantially composed of plastic material.

9. The front fascia of claim 1, wherein the badge is coated with a substance of low relative electric permittivity, preferably in the range of 5 to 8.

10. The front fascia of claim 1, wherein the badge is coated with an illuminating plastic film or a vaporized metallic film.

11. The front fascia of claim 1, wherein the badge is coated with an enhanced specular reflector material (ESR) layer with a substantially high reflectivity in the visible wavelength region.

12. The front fascia of claim 1, wherein the badge's front surface has water-tight characteristics, thus preventing the accumulation of any film of water therein.

13. A front fascia for a vehicle, the vehicle including a forward facing radar system emitting radar beams that pass through the front fascia, the front fascia comprising
   a decorative badge attached to the fascia at a badge mounting region, the badge the badge including a front piece attached to a front surface of the badge mounting region, and a rear piece attached to a rear surface of the badge mounting region, front piece and the rear piece being in registration with another and the badge being positioned such that at least a portion of the radar beams pass through the badge;
   wherein a cumulative thickness of the badge and badge mounting region traversed by the radar beams passing through the badge and badge mounting region remains substantially uniform across the badge mounting region.

14. The front fascia of claim 13, wherein the front piece has a front surface, and a rear surface attached to the fascia's front surface, and the rear piece has a rear surface, and a front surface attached the fascia's rear surface.

15. The front fascia of claim 14, wherein the front surface of the front piece, and the rear surface of the rear piece, have decorative protrusions and depressions provided at different locations thereon, in a manner that each protrusion within the front piece substantially aligns with a depressions within the rear piece, and each depression within the front surface substantially aligns with a protrusion within the rear piece, to form a corresponding protrusion depression pair, and to maintain a constant overall thickness of the badge and the fascia intercepting the emitted radar beams, in the badge mounting region.

16. The front fascia of claim 15, wherein in each protrusion depression pair, the protrusion and the depression have similar surface profiles.

17. The front fascia of claim 13, wherein the cumulative average thickness of the badge and the fascia in the badge mounting region, depends at least upon the composing material of the badge.

18. The front fascia of claim 13, wherein the badge is substantially composed of plastic material.

19. The front fascia of claim 13, wherein the badge is coated with one of an illuminating plastic film, a vaporized metallic film, and an enhanced specular reflector material layer with a substantially high reflectivity in the visible wavelength region.

20. A front fascia for a vehicle, the vehicle including a forward facing radar system emitting radar beams that pass through the front fascia, the front fascia comprising
   a decorative badge attached to the fascia at a badge mounting region, the badge being positioned such that at least a portion of the radar beams pass through the badge;
   wherein a cumulative thickness of the badge and badge mounting region traversed by each radar beam passing through the badge and badge mounting region is substantially the same.

* * * * *